BEST AVAILABLE COPY

Nov. 1, 1938. B. C. BOULTON ET AL Des. Re. 20,900

AIRPLANE

Original Filed April 15, 1937 3 Sheets-Sheet 1

INVENTORS.
BERTHOUD C. BOULTON
BY JAMES S. McDONNELL, JR.
Harrison Sebo
ATTORNEY.

BEST AVAILABLE COPY

Nov. 1, 1938. B. C. BOULTON ET AL Des. Re. 20,900

AIRPLANE

Original Filed April 15, 1937 3 Sheets-Sheet 2

INVENTORS.
BERTHOUD C. BOULTON
BY JAMES S. McDONNELL, JR.
Harrison Sons
ATTORNEY.

BEST AVAILABLE COPY

Nov. 1, 1938. B. C. BOULTON ET AL. Des. Re. 20,900

AIRPLANE

Original Filed April 15, 1937 3 Sheets-Sheet 3

INVENTORS.
BERTHOUD C. BOULTON
BY JAMES S. McDONNELL, JR.
Harrison Bates
ATTORNEY.

UNITED STATES PATENT OFFICE 20,900

DESIGN FOR AN AIRPLANE

Berthoud C. Boulton, Towson, and James S. McDonnell, Jr., Baltimore, Md., assignors to The Glenn L. Martin Company, Baltimore, Md.

Original No. 107,891, dated January 11, 1938, Serial No. 68,792, April 15, 1937, for 14 years. Application for reissue August 26, 1938, Serial No. 79,587. Term of patent 14 years

*To all whom it may concern:*

Be it known that we, Berthoud C. Boulton and James S. McDonnell, Jr., citizens of the United States and residents, respectively, of Towson, in the county of Baltimore and State of Maryland, and of Baltimore, in the State of Maryland, have invented a new, original, and ornamental Design for an Airplane, of which the following is a specification, reference being had to the accompanying drawings, forming part thereof.

Figure 1:
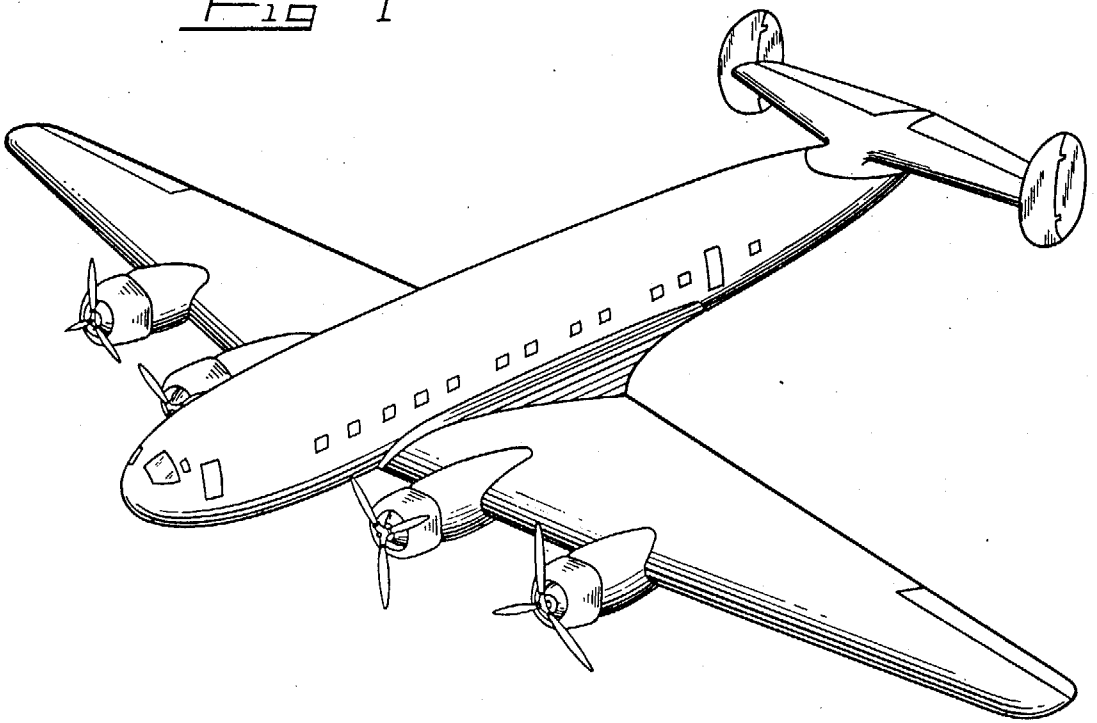
Fig. 1 is a perspective view of the subject airplane in flight.
Figure 2:
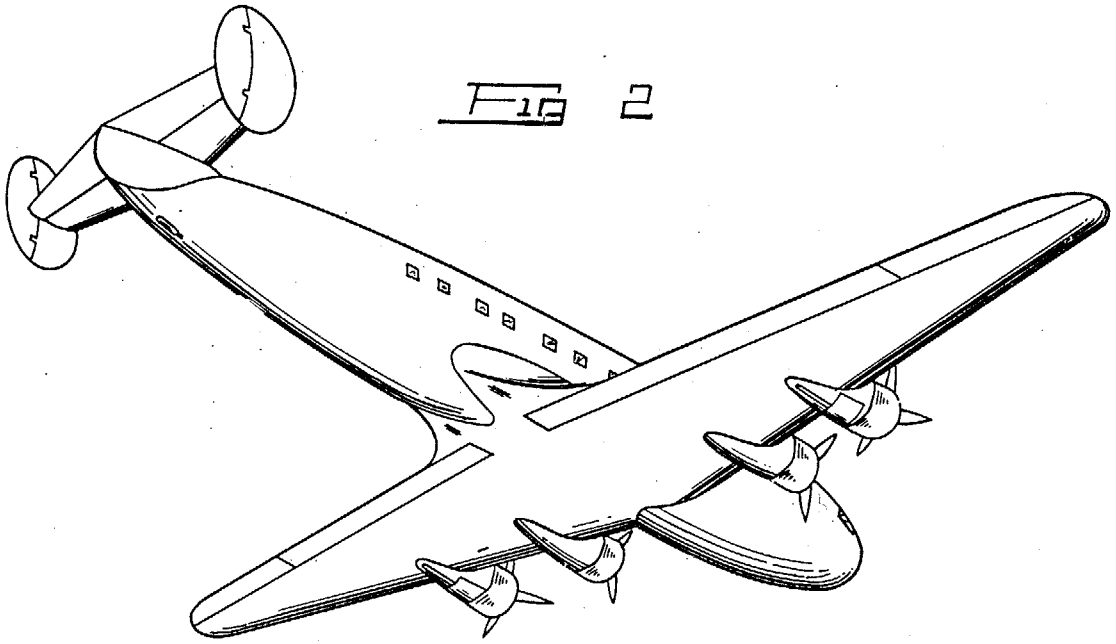
Fig. 2 is a perspective view differing from Figure 1 in angularity and showing the landing gear in retracted position.
Figure 3:
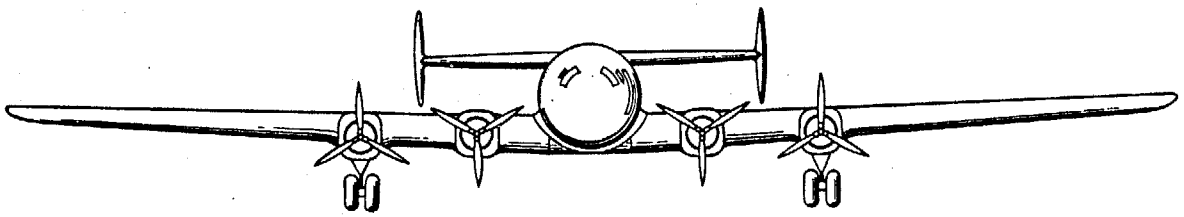
Fig. 3 is a front elevation of the airplane shown in either figure when the landing wheels are extended for ground engagement.
Figure 4:
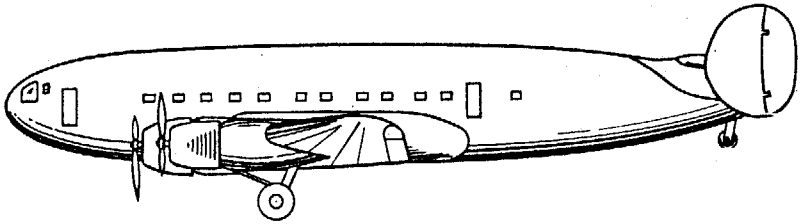
Fig. 4 is a side elevation of Figure 3.

The characteristic features of the design reside in the configuration of the motor cowlings and the empennage section, as well as the association and relation of these elements with the remaining portion of the airplane.

We claim:

The ornamental design for an airplane, substantially as shown and described.

BERTHOUD C. BOULTON.
JAMES S. McDONNELL, JR.